United States Patent

Porowski

Patent Number: 5,278,878
Date of Patent: Jan. 11, 1994

[54] PROCESS FOR REDUCING TENSILE WELDING STRESSES IN A NOZZLE IN A NUCLEAR REACTOR SHELL

[76] Inventor: Jan S. Porowski, 241 Curry Hollow Rd., Pittsburgh, Pa. 15236

[21] Appl. No.: 975,727

[22] Filed: Nov. 13, 1992

[51] Int. Cl.$^5$ .............................................. G21C 13/00
[52] U.S. Cl. .................................. 376/260; 376/204; 29/446; 72/370; 228/199
[58] Field of Search ............... 376/204, 260, 277, 296, 376/463; 72/367, 370; 228/119, 155, 199; 29/446, 452, 723, 906

[56] References Cited

U.S. PATENT DOCUMENTS

| | | | |
|---|---|---|---|
| 3,625,568 | 12/1971 | Verdier | 228/199 |
| 4,491,001 | 1/1985 | Yoshida et al. | 72/76 |
| 4,612,071 | 9/1986 | O'Donnell et al. | 72/367 |
| 4,683,014 | 7/1987 | Porowski et al. | 72/367 |
| 5,065,934 | 11/1991 | Ito | 228/155 |
| 5,196,160 | 3/1993 | Porowski et al. | 376/260 |

*Primary Examiner*—Daniel D. Wasil
*Attorney, Agent, or Firm*—Roylance, Abrams, Berdo & Goodman

[57] ABSTRACT

A process is claimed for reducing tensile welding stresses in a nozzle in a nuclear reactor shell, such as a nuclear reactor head, wherein the nozzle has been welded to the nuclear reactor shell, which involves applying axial compressive loads on the free ends of the nozzle in an amount sufficient to substantially reduce the welding stresses. In some cases radial pressure can be imposed on the inner wall of the nozzle wherein the tensile welding stresses are located.

11 Claims, 4 Drawing Sheets

PROCESS FOR REDUCING TENSILE WELDING STRESSES IN A NOZZLE IN A NUCLEAR REACTOR SHELL

BACKGROUND OF THE INVENTION

1. Field of the Invention

This invention relates to a process for reducing tensile welding stresses in nozzles in a nuclear reactor shell, preferably in a nuclear reactor head, said nuclear reactor shell having been provided with nozzles extending through openings in said shell, said nozzles having been welded to said nuclear reactor shell through a weld lying on an inner surface of said nuclear reactor shell and the outer surface of said nozzle immediately adjacent thereto, said welding resulting in the generation of high tensile welding stresses in the wall of said nozzle adjacent to said weld, which comprises applying axial compressive loads, or pressures, on the free ends of said nozzles sufficient to substantially reduce said welding stresses.

2. Description of the Prior Art

Nuclear reactors are normally provided in the shell thereof, particularly in the head thereof, with nozzles generally extending substantially vertically through openings therein and which are circumferentially welded to said shell through a weld lying on the inner surface of said shell and on the outer surface of said nozzle immediately adjacent thereto. These nozzles, particularly when they extend through the head of a nuclear reactor, generally are made of alloys of nickel or stainless steel, such as an Inconel alloy, such as Inconel 600, provide for passage therethrough of control rod drive shafts attached to an exterior control rod drive mechanism. The tensile stresses generated from the weld holding the nozzle to the nuclear reactor head tend to facilitate stress corrosion crack formation in the inner surface of the nozzle in the vicinity of said weld. These cracks, in time, can extend upwardly into the body of the nozzle or into a portion of the weld, or both, into communication with the outer surface of the nozzle above the weld, into the space between the outer surface of the nozzle and the adjacent surface of the head opening, and then to the exterior of the reactor. Irradiated water can thus pass upwardly into the atmosphere, creating a serious pollution problem. If the cracks are circumferential, the nozzle can be detached from the reactor head by the pressure in the reactor, also with damaging results.

As seen in U.S. Pat. No. 5,196,160, filed Mar. 23, 1992, one way to obviate such problems is to form a coaxial circumferential groove extending upwardly into at least a portion of the nozzle that extends into the reactor and then filling such circumferential groove with a weld material.

I have now found that such problems in the nozzle arising from the tensile stresses generated in the wall of said nozzle adjacent to the weld holding said nozzle to said nuclear reactor shell, particularly a nuclear reactor shell, can be substantially reduced by applying axial compressive loads to the free ends of said nozzles.

BRIEF DESCRIPTION OF THE INVENTION

Figure 1:
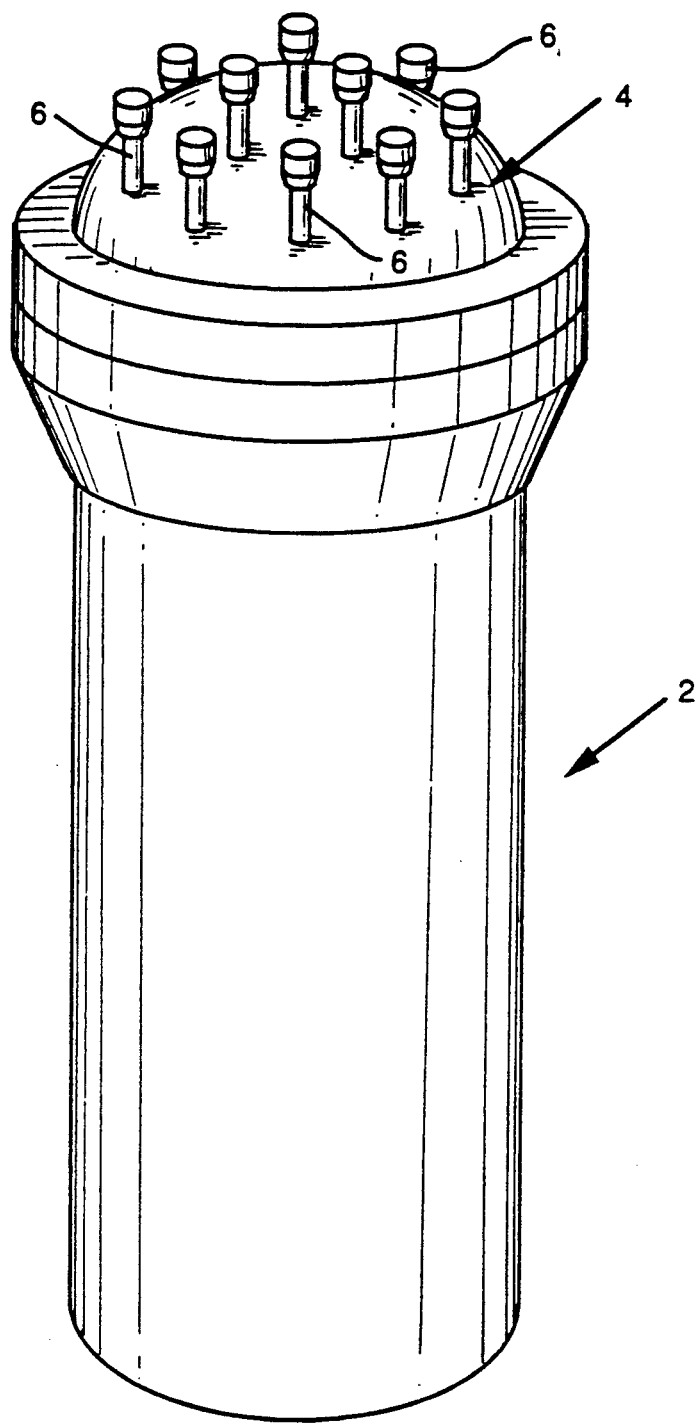
FIG. 1 is an isometric view of a nuclear pressure reactor having a head provided with nozzles extending vertically therethrough into the body thereof.

Referring to the drawings, reference numeral 2 in FIG. 1 defines a nuclear reactor pressure vessel provided with a head 4 having openings through which a number of nozzles 6 extend substantially vertically into the interior of said vessel 2.

Figure 2:
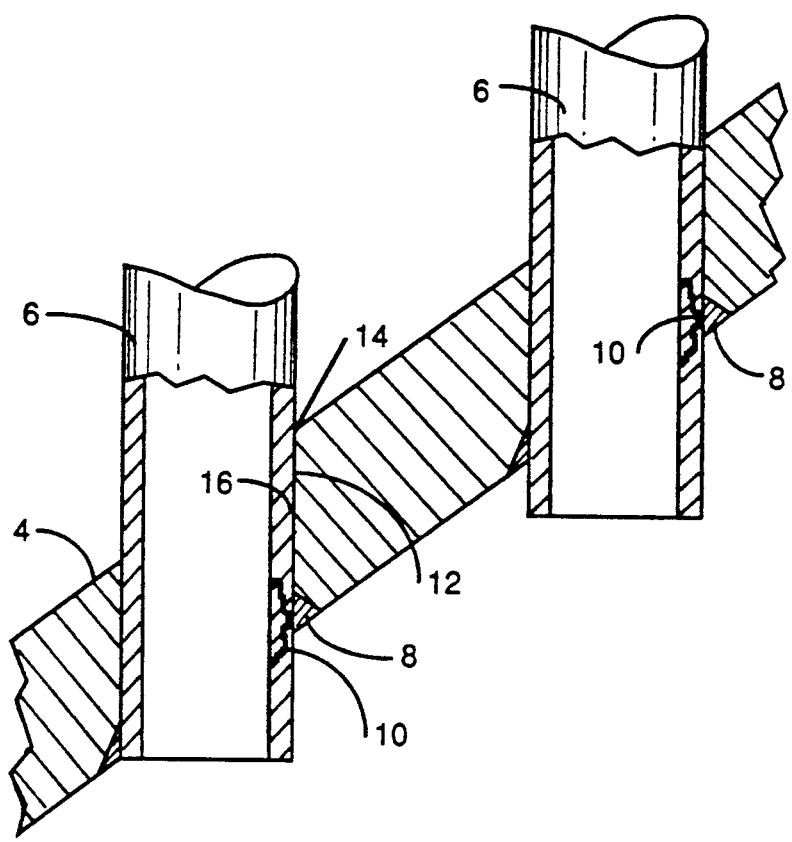
FIG. 2 is a side-elevational view, partly in section, of a portion of a nuclear reactor head showing two of the nozzles extending therethrough and welded thereto.

Referring to FIG. 2, each of nozzles 6 is normally circumferentially welded to head 4 through a weld 8 immediately adjacent thereto. The corresponding outer adjacent surfaces of head 4 and nozzles 6 are normally not welded to each other. Since each of nozzles 6 is capped at an upper end thereof (see FIG. 1), and is circumferentially welded to head 4, pressurized hot water in the reactor interior is normally retained therein. However, as discussed above, the weld 8 tends to generate tensile welding stresses in the inner surface of the nozzles 6 in the vicinity of such weld, which can, and quite often does, result in the formation of cracks 10 on said inner surface in the presence of pressurized hot water. These cracks 10, which are generally longitudinal in direction, can move outwardly and upwardly in the nozzle bulk, into a portion of the weld 8, or both. These cracks 10 as they move upwardly can grow and eventually can communicate with the outer surface of nozzle 6 above weld 8, so that pressurized water within the nuclear reactor can flow therethrough into the free space lying between the inner surface 12 of opening 14 in head 4 and the adjacent outer surface 16 of nozzle 2 into the atmosphere, thereby creating serious pollution problems in the atmosphere.

I have found that such high tensile welding stresses generated by such welding in the nozzles can be substantially reduced by the application of axial compressive loads on the free end faces of said nozzles. if such axial compressive loads are so applied to the nozzles 6 prior to the formation of cracks 10, the formation of such cracks is substantially inhibited. However, if such axial compressive loads are so applied to the nozzles 6 after the formation of cracks 10, the further growth and propagation of such cracks is severely inhibited. In both cases, the problems arising from the existence of high tensile stresses generated by welding are greatly reduced. When cracks 10 have formed in the nozzles 6 as a result of the high tensile welding stresses and the axial compressive loads have been applied on the free ends of the nozzles to substantially reduce such high tensile welding stresses, in accordance with one of the embodiments of the invention defined and claimed herein, if desired to further avoid any problems that might still arise from the presence of cracks 10 in the nozzles 6, such cracks can be physically removed in any suitable manner, for example, by subjecting the inner surface thereof in the crack area to electrical discharge machining (EDN Process) or a grinding operation until the crack disappears and a clean surface is obtained. The operation of reducing the high tensile stresses in the nozzles 6 and the subsequent removal of the cracks 10 is obviously far superior to an operation wherein the cracks 10 are removed without reducing the high tensile stress. When reduction in high tensile welding stresses is obtained residual tensile welding stresses remain and removal of cracks is then carried out, the formation of further cracks is greatly inhibited, whereas when cracks are removed, without reduction of high tensile welding stresses, the presence of such high tensile welding stresses will still tend to form such cracks, for the reasons fully set forth above.

Figure 3:
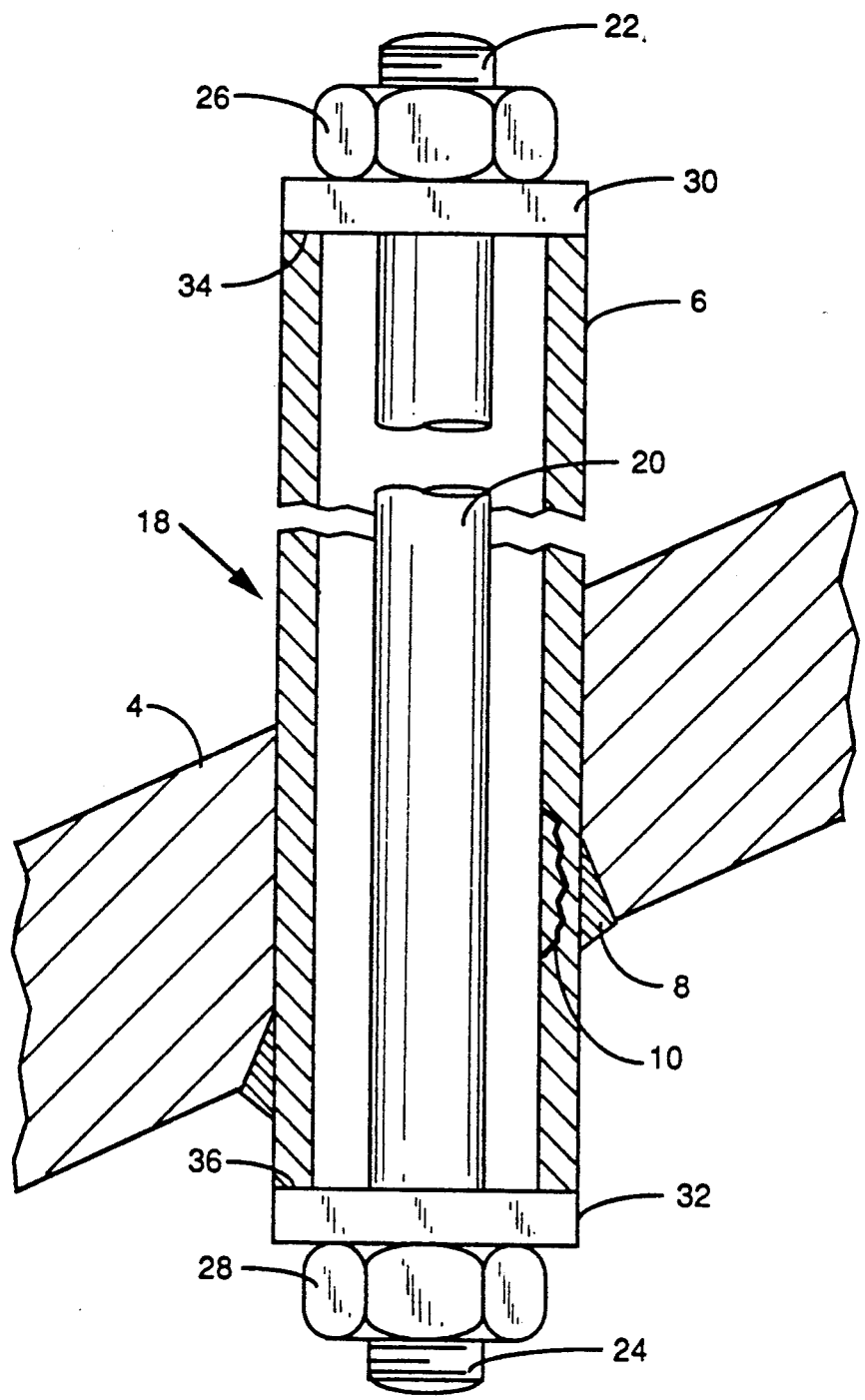
FIG. 3 is a side-elevational view, partly in section, of a portion of a nuclear reactor head showing one of the nozzles welded thereto and means for applying axial compressive loads on the free ends of said nozzle for substantially reducing tensile welding stresses in said nozzle.

The application of axial compressive loads on the free ends of nozzles 6 to substantially reduce the high tensile welding stresses generated therein as a result of welds 8 can be affected in any suitable or convenient manner. One means for doing this is illustrated in FIG. 3, wherein the device 18 comprises a shaft 20 having threads 22 and 24 on the extreme ends thereof carrying nuts 26 and 28, respectively, thereon and shoulders 30 and 32 freely disposed between the circumferential free ends 34 and 36 of nozzle 6 and nuts 26 and 28, respectively. To obtain the desired axial compressive loads the device 18 is merely placed in the position shown in FIG. 3 and one or both of nuts 26 and 28 are rotated clockwise until the desired axial compressive load is applied to the free ends of nozzle 6 sufficient to substantially reduce the high tensile welding stress in nozzle 6. The individual parts of the device 18, namely, shaft 20, nuts 26 and 28 and shoulders 30 and 32 are then removed from the nozzle 6.

To minimize the possibility that under certain conditions of the design, or because of the materials of construction, of nozzle 6, the amount of axial compressive load necessary to obtain the desired reduction in high tensile welding stresses would be so great that buckling of nozzle 6 might occur, I have found that the amount of the axial compressive load can be reduced and the remainder of the amount necessary to obtain the desired result can be obtained by imposing sufficient radial pressure on the inner surface of nozzle 6 wherein the high tensile welding stresses generated by the weld 8 are located, that is, generally the inner surface of nozzle 6 opposite weld 8. Here, too, such radial pressure can be imposed in any suitable or convenient manner. One such means is illustrated in FIG. 4.

Figure 4:
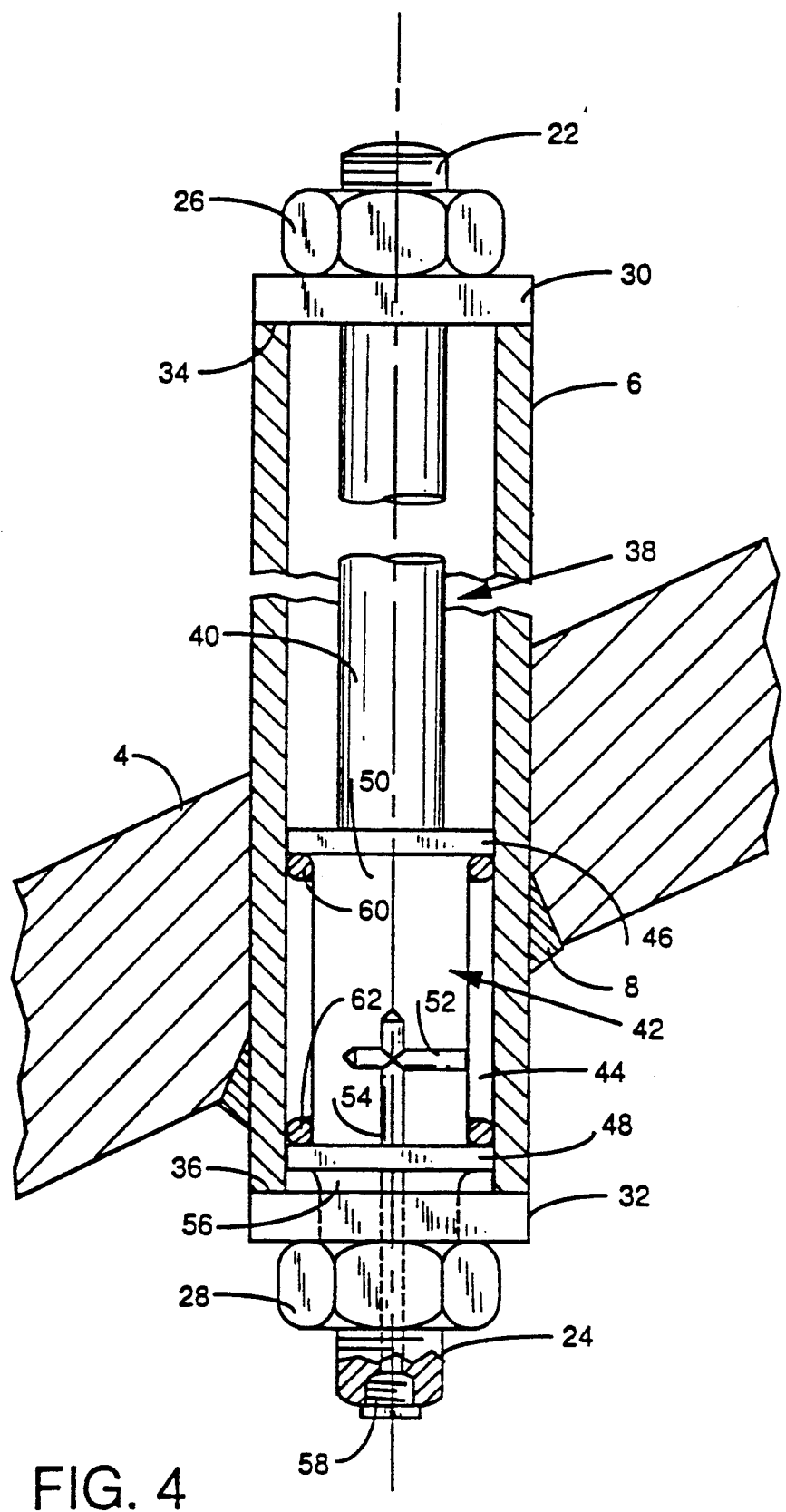
FIG. 4 is also a side-elevational view, partly in section, of a portion of a nuclear reactor head showing one of the nozzles welded thereto and means for applying axial compressive loads on the free ends of said nozzle for substantially reducing tensile welding stresses in said nozzle as well as means for applying radial pressure on the inner surface of said nozzle in the location wherein the high residual tensile stresses generated by welding are located.

Referring to FIG. 4, the device 38 shown therein is a modification of the device 18 used in FIG. 3, which operates in the same manner as device 18 to obtain the desired axial compressive load but additionally provides means to obtain the desired radial pressure on the inner surface of nozzle 6 wherein the high tensile welding stresses generated by the weld 8 are located. In the modification of FIG. 4, shaft 40 is provided with an enlarged radial lower end 42 which helps to define a chamber 44. This is accomplished by providing said enlarged lower end 42 with spaced-apart radial extensions 46 and 48 in close contact with the adjacent inner wall of nozzle 6 and a substantial radial portion 50 therebetween having a diameter smaller than the diameter of said spaced-apart radial extensions 46 and 48 sufficient to provide adequate space in the chamber 44 so formed to contain a fluid, such as an oil, natural or synthetic, or water. Chamber 44 communicates with the atmosphere through line 52 in the enlarged lower end 42 and then continuing through line 54 in the enlarged lower end 42 and the remaining lower end 56 of shaft 40. To provide means for introducing a fluid into chamber 44 by way of lines 52 and 54, the lower portion of line 54 is provided with an enlarged threaded tap hole 58 for attaching a line to a pressurized fluid source. To prevent leakage of fluid from chamber 44, the upper and lower portions thereof adjacent radial extensions 46 and 48 are provided with resilient seals 60 and 62, respectively. In the situation illustrated in FIG. 4, the high tensile welding stresses are shown not to have resulted in the product of cracks in the vicinity of the weld at the time of the operation defined herein has been carried out, although the operation in such situation would be similarly carried out had cracks previously occurred. Generally, when each of the pressure operations defined herein is carried out, application of the axial compressive load is carried out followed by the application of the defined radial pressure. Of course both operations can be carried out in reversed order or simultaneously.

The total applied loads and the corresponding stresses required herein to obtain the desired reduction in the high tensile welding stresses in the vicinity of the weld must be that amount sufficient to result in the plastic flow of the material in the region of the nozzle wherein the undesired high tensile welding stresses are to be reduced. By "plastic flow" I mean the point at which permanent deformation of the material being treated is obtained.

As an example of how a determination of the amount of axial compressive load that need be applied to the free ends (that is, onto the cross-sectional area of the free ends) of the nozzle can be calculated, the following guide can be used: axial compressive stress required ($\sigma_a$) equals the sum of the yield strength of the nozzle material ($S_y$) plus the desired reduction of the maximum tensile stress ($\Delta\sigma$) minus the maximum high tensile welding stresses in the welded condition ($\sigma_{max}$) or $$\sigma_a = S_y + \Delta\sigma - \sigma_{max}. \tag{I}$$

Thus $\sigma_{max}$ can be in the range of about 3,000 to about 120,000 psi tension, generally about 15,000 to about 80,000 psi tension. When the nozzle is Inconel 600, for example, $\sigma_{max}$ can be in the range of about 30,000 to about 60,000 psi tension. With Stainless 304 $\sigma_{max}$ can be in the range of about 20,000 to about 40,000 psi tension. $S_y$ can be in the range of about 10,000 to about 120,000 psi, generally about 20,000 to about 80,000 psi. When the nozzle is Inconel 600, $S_y$ can be in the range of about 40,000 to about 55,000 psi. With Stainless 304 $S_y$ can be in the range of about 25,000 to about 35,000 psi. $\Delta\sigma$ can be in the range of about 3,000 to about 120,000 psi, generally about 5,000 to about 80,000 psi. When the nozzle is Inconel 600 $\Delta\sigma$ can be in the range of about 10,000 to about 60,000 psi. With Stainless 304 $\Delta\sigma$ can be in the range of about 5,000 to about 40,000 psi.

If radial pressure is also applied on the inner surface of the nozzle in addition to the compressive load, as defined above, Equation (I) above still applies, but the required axial compressive load is reduced by the hoop stress ($\sigma_p$) generated by the pressure imposed on the inner wall of the nozzle adjacent, or opposite the weld area. The applicable formula then becomes the following:

$$\sigma_a = S_y + \Delta\sigma - \sigma_{max} - \sigma_p \quad \text{(II)}$$

In Equation II $\sigma_{max}$, $S_y$ and $\Delta_{94}$ are the same as in Equation I. $\sigma_p$ can be in the range of about 1,000 to about 100,000 psi tension, generally about 2,000 to about 60,000 psi tension. When the nozzle is Inconel 600, $\sigma_p$ can be in the range of about 2,000 to about 50,000 psi tension. With Stainless 304 $\sigma_p$ can be in the range of about 2,000 to about 40,000 psi tension.

DESCRIPTION OF SPECIFIC EXAMPLES

The invention described and claimed herein can further be understood by reference to the following examples.

EXAMPLE I

A nozzle made of Inconel 600 having a yield strength of 55,000 psi, a length of 8.38 inches, an outer diameter of 4.50 inches and an inner diameter of 3.26 inches was passed through an opening in a shell made of A-36 carbon steel and welded thereto. The welding operation resulted in the generation of high tensile welding stresses in the wall thereof adjacent said weld rising to a maximum of about 50,000 psi. Axial load was applied to the free cross-sectional ends of the nozzle, using apparatus similar to that illustrated in FIG. 3, in the amount of about 40,000 psi for about 30 seconds. The apparatus was then promptly removed. The high tensile we stresses in the nozzle wall adjacent the weld zone were reduced to 15,000 psi tension.

EXAMPLE II

In this example a nozzle welded to a shell, identical to that used in Example I, was subjected to both an axial compressive load, as defined in Example I, and radial pressure on the inner surface of the nozzle in the zone wherein the high tensile welding stresses were located, using apparatus therefor similar to that illustrated in FIG. 4. Compressed oil was used to impose pressure on the inner wall of the nozzle. An axial compressive load in the amount of 5,000 psi tension was applied over a period of about 30 seconds, after which a radial pressure of 13,255 psi tension was applied over a period of about 30 seconds to the inner surface of the nozzle in the zone wherein the high tensile welding stresses generated by welding were located. The high tensile welding stresses in the nozzle wall adjacent the weld zone were reduced to 15,000 psi tension.

Obviously, many modifications and variations of the invention, as hereinabove set forth, can be made without departing from the spirit and scope thereof and, therefore, only such limitations should be imposed as are indicated in the appended claims.

I claim:

1. A process for reducing tensile welding stresses in a nozzle in a nuclear reactor shell, comprising the steps of providing said nuclear reactor shell having at least one nozzle with a first and second free end face and extending through openings in said shell, said nozzle having been welded to said nuclear reactor shell through a weld lying on an inner surface of said nuclear reactor shell and an outer surface of said nozzle immediately adjacent thereto, said weld resulting in a generation of tensile welding stresses in said wall of said nozzle adjacent to said weld, and applying an axial compressive load on at least one of said free end faces of said nozzle sufficient to substantially reduce said tensile welding stresses.

2. The process of claim 1 wherein said shell comprises a nuclear reactor head.

3. The process of claim 2 wherein the amount of compressive load so applied is sufficient to cause permanent deformation of the material in the nozzle wherein said high tensile welding stresses are located.

4. The process of claim 1 wherein said welding tensile stresses is in the range of 3,000 to about 120,000 psi tension.

5. The process of claim 1 wherein said welding tensile stresses is in the range of 15,000 to about 80,000 psi tension.

6. The process of claim 1 wherein said nozzle is made of alloys of nickel and stainless steel.

7. The process of claim 6 wherein said nozzle is made of Inconel 600.

8. The process of claim 1 comprising the additional step of
    removing a crack formed in said wall of said nozzle as a result of said welding tensile stresses.

9. The process of claim 1 comprising the additional step of
    applying radial pressure on said inner wall of said nozzle wherein said tensile welding stresses are located in an amount sufficient to reduce said tensile welding stresses.

10. The process of claim 9 wherein said radial pressure is applied subsequent to the application of said axial compressive load.

11. The process of claim 9 wherein said radial pressure is applied before the application of said axial compressive load.

* * * * *